(No Model.)
A. G. PERRY.
COTTON SEED PLANTER AND FERTILIZER DISTRIBUTER.
No. 290,920. Patented Dec. 25, 1883.
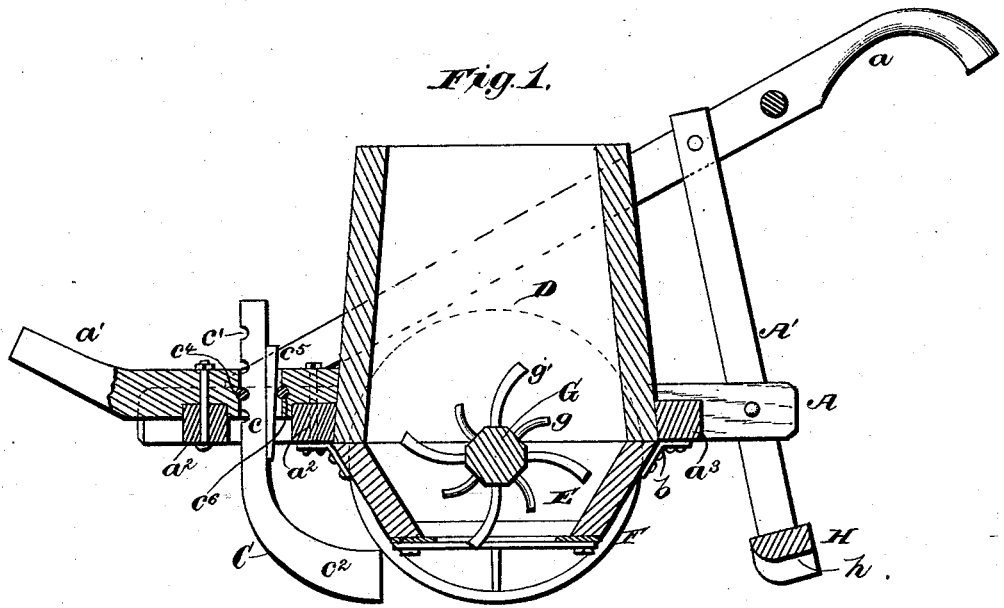
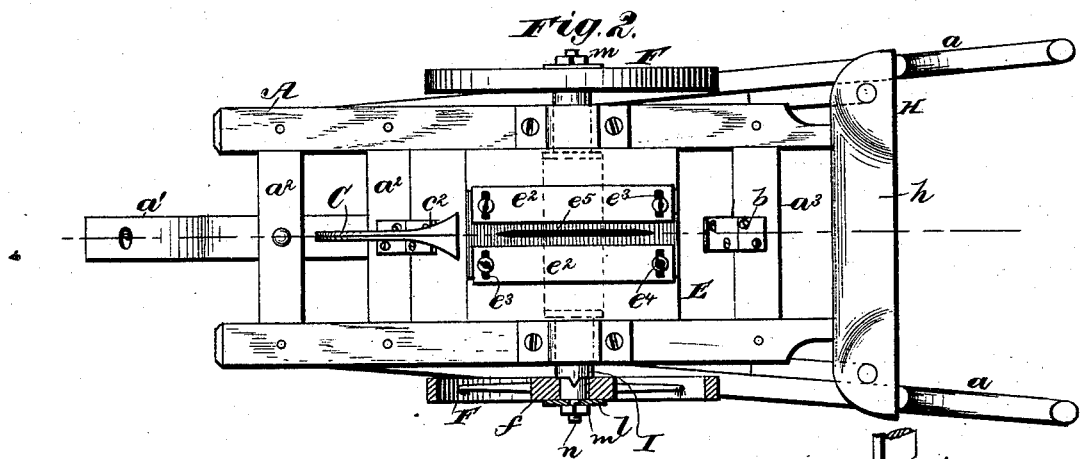
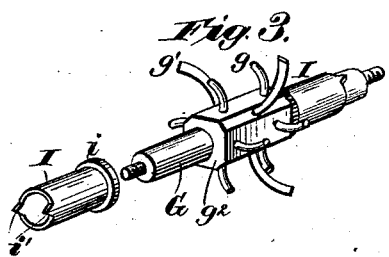
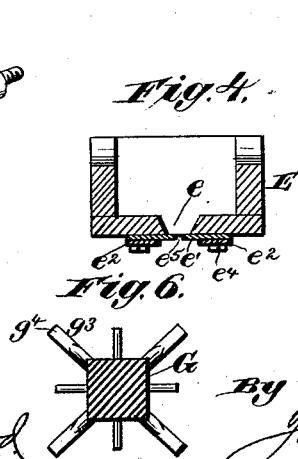
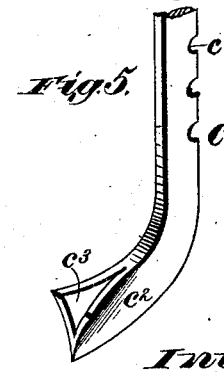
Witnesses.
Robert Everett,
J. A. Rutherford
Inventor.
Alvy G. Perry,
By James L. Norris.
Atty.

UNITED STATES PATENT OFFICE.

ALVY G. PERRY, OF COLDWATER, MISSISSIPPI.

COTTON-SEED PLANTER AND FERTILIZER-DISTRIBUTER.

SPECIFICATION forming part of Letters Patent No. 290,920, dated December 25, 1883.

Application filed July 27, 1883. (No model.)

*To all whom it may concern:*

Be it known that I, ALVY G. PERRY, a citizen of the United States, residing at Coldwater, in the county of Tate and State of Mississippi, have invented new and useful Improvements in Cotton-Seed Planters and Fertilizer-Distributers, of which the following is a specification.

My invention relates to apparatus for planting cotton-seed and distributing fertilizing compounds; and it consists, broadly, in the combination, with a wheeled carriage, of an adjustable furrowing device, a seed-box having a discharge-opening closed by a strip of flexible material having a central longitudinal slit, and a shaft revolving in said box and carrying curved arms, which pass successively through the slit in the flexible strip, pushing the seeds or the granules of the fertilizing compound before them, and dropping the same at equal intervals, a covering device being arranged upon the carriage in rear of the seed-box.

My invention consists, also, in the combination, with the box of a seeding-machine, of a flexible strip covering the discharge-opening, and having a central longitudinal slit, with metallic supporting-plates adjustable toward and from each other, and devices for forcing the seed at intervals through said flexible strip.

It also consists in a certain novel construction of parts whereby the wheels of the carriage are made rigid upon their axle, and bearings given the latter in the walls of the seed-box, all of which will be fully described, and then more specifically pointed out in the claims.

Referring to the drawings, forming part of this application, Figure 1 is a vertical longitudinal section taken through the center of the apparatus. Fig. 2 is a plan view of the apparatus inverted. Fig. 3 is a detail perspective of the axle detached with the seeding drills and bearing-thimbles. Fig. 4 is a central transverse section of the lower portion of the seed-box. Fig. 5 is a perspective view of the furrowing device. Fig. 6 is a transverse section of the axle, showing a modified form of seeding device.

A in said drawings indicates the frame of the carriage, which is provided with handles $a\,a$, projecting toward the rear, and a beam or clevis, $a'$, to which a single-tree may be attached. The side bars of the frame A are united by cross-beams $a^2\,a^2$, to which the traction-bar $a'$ is bolted, and a rear beam, $a^3$, which acts also as a support for the seed-box. Between the braces $a^2\,a^2$ the traction-bar $a'$ is mortised, and in said opening is placed the shank of a furrow-cutter, C. This device, which is shown in detail in Fig. 5, consists of a metallic plate having a vertical shank, $c$, with half-round notches $c'$ in its forward edge, and a lower portion, $c^2$, which is bent downward and backward, its edge being sharp, and the end of the curved portion being split and spread open, as shown at $c^3$, Fig. 5. When placed in the opening in the bar $a'$, the notches $c'$ engage with a metallic rod or bolt, $c^4$, which is placed transversely in the front of the mortise; and a key or wedge, $c^5$, inserted behind the shank $c$, serves to keep the parts in engagement and to permit the vertical adjustment of the cutter C. A second transverse bolt, $c^6$, may be inserted in the rear part of the mortise, to provide bearing for the wedging-face of the key $c^5$.

Between one of the braces $a^2$ and the beam $a^3$ the seed-box D is supported, being attached thereto by metal straps $b$, or in any suitable manner. This receptacle consists of a rectangular structure having its front and rear wall diverging slightly from the top toward the bottom, in order to prevent the seed or other material from packing therein as it works downward. At its lower and larger end the seed-box opens into a shallow hopper, E, having its front and rear walls converging downwardly. The lower end of said hopper is provided with a longitudinal opening, $e$, having its sides converging, and this opening is closed by a strip of leather or other flexible material, $e'$, having a slit, $e^5$, which is central to the opening in the hopper, and coextensive therewith, or nearly so. Upon the outer surface of said strip are laid two metal plates, $e^2\,e^2$, arranged longitudinally of the apparatus, and having a space left between them. These plates have transverse slots $e^3$ in their ends, through which pass attaching-screws $c^4$. By this construction the plates may be adjusted toward and from each other.

The frame A, together with the parts carried by it, is supported upon wheels F F, which, by a construction presently to be described, are rigid upon an axle, G. The latter, which is arranged just beneath the side bars of the frame, and has bearings in the same, passes through the seed-box and hopper just below their line of junction, and that portion which lies within the hopper is provided with radial arms $g\ g$, which serve to loosen and agitate the seed or other material contained in said receptacle and prevent it from packing. In the center of the axle, and in the same vertical plane with the slit $e^5$ in the leather strip $e'$, are placed radiating feed-arms $g'$, the number of which may be varied, if desired. They are set at equal intervals, and each is slightly curved, and the body of each is flattened, so as to present a convex edge in the direction of their revolution. These arms are of such length that their ends, as they revolve, pass through the forward extremity of the slit $e^5$ in the leather $e'$, protrude somewhat at the middle point of said slit, and are drawn in at or near the rear end of the opening.

At the rear of the frame A are placed downwardly-inclined braces A' A', bolted to the handles and to the side bars, and having their ends projecting beneath the latter nearly to the ground. A cross-piece, H, is attached to said ends, having its forward edge rounded off and a shallow recess, $h$, formed in its lower face.

The parts thus described operate in the following manner: Cotton-seed having been placed in the seed-box D and the furrow-cutter C being adjusted to cut to the required depth in the soil, the operator, grasping the handles B B, propels the apparatus before him; or a single-tree may be applied to the traction-beam $a'$ and a horse be used to draw the seeder. As it advances, the blade $c^2$ cuts a furrow in the soil, and the spread end of the blade throws the earth upon each side and prevents it from falling back into the furrow. As the axle G revolves, the curved arms $g'$ are pushed successively through the slitted strip $e'$, each one carrying before it one, two, or more seeds and dropping them into the furrow cut by the blade $c^2$, and which is exactly in the line of the slit $e^5$, through which the seeds pass. The bar H is now drawn over the deposited seed, turning the displaced soil back and covering the seed, the earth being compressed by bearing down upon the handles B B.

The wheels F are secured upon the axle G in the following manner: An iron thimble, I, having a collar, $i$, is forced upon each end of the axle until the collar lies against the shoulder $g^2$. Upon the outer end the thimble or sleeve I is provided with lugs $i'$, having sharpened extremities. The length of each sleeve is such that when in position it will expose the extremity of the axle for a space equal to the length of the wheel-hub $f$, the pointed lugs $i'$ projecting into this space. When the wheel is driven upon the axle, the lugs $i'$ will enter the inner ends of the hub and lock it rigidly upon the axle. The sleeves I have bearing in half-boxes in the side bars of the frame A, and the collars $i$ bear against the inner sides of said bars, preventing lateral play of the axle. Each wheel is held upon the axle by a washer and nut, $l$ and $m$, the latter turning upon the end of a threaded rod, $n$, which projects from the axle, thereby holding the hub in close engagement with the lugs. The boxes in the side bars may be lined with metal to prevent undue wear.

The apparatus shown may be used for distributing manures, fertilizing compounds, and similar materials. In such cases the feeding device may be changed, and the modified form shown in Fig. 6 may be substituted. In this device the feeding-arms are made straight, as seen at $g^3$, each arm having a flattened extremity, $g^4$. When used for planting cotton-seed, I prefer the curved arms $g'$, since the lint upon the seed will be more easily stripped from the curved edge as the arm traverses the slit in the leather strip, thereby preventing said arms from choking or clogging with an accumulation of such lint.

By using a slitted flexible material—such as leather—to close the bottom of the hopper, I prevent the waste or escape of the seed, except as it is carried through said opening by the feeding-arms, the material possessing sufficient elasticity, especially when supported by the metal plates $c^2\ c^2$, to close the slit after the feeding-arm passes.

Having thus described my invention, what I claim is—

1. The combination, with the wheeled carriage A, of the furrow-cutter C, curved rearwardly, and having the upper edge of its rear end split and spread open, and provided with half-round notches $c'$ in its forward edge, the mortised traction-bar, a bolt, $c^4$, placed transversely in said mortise, and entering one of said notches, and the key $c^5$, substantially as described.

2. The combination, with the seed-box having its dimension increasing from the top toward the bottom, of a hopper having downwardly-converging walls, a discharge-opening in its bottom, a strip of flexible material covering said opening, and having a slit coincident therewith, and feeding-arms which traverse the hopper and pass through the slit at regular intervals, substantially as described.

3. The combination, with the hopper having its discharge-opening covered by a slitted strip of leather, of metal plates supporting said strip, and having lateral adjustment toward and from each other, substantially as described.

4. The combination, with the axle carrying the feeding-arms, of metallic thimbles or sleeves having collars lying against the shoulders of the axles, and provided with pointed lugs upon their outer ends, and of the wheels having wooden hubs $f$, which engage with the said lugs and lock the wheels rigidly upon the axles, substantially as described.

5. The combination, with the wheeled carriage A, of the vertically-adjustable furrow-cutter C, curved rearwardly and having the upper edge of its rear end split and spread open, the seed-box D, and hopper E, having an opening in its bottom for dropping the seed into the furrow made by cutter C, the axle G, carrying arms $g$ and $g'$, for forcing seed through the opening in the hopper, and the covering device H, having its forward edge rounded and a recess formed in its lower face, substantially as described.

In testimony whereof I have hereunto set my hand in the presence of two subscribing witnesses.

A. G. PERRY.

Witnesses:
J. R. TURLEY,
A. G. ATKINS.